UNITED STATES PATENT OFFICE.

VARNUM WILLIAMSON, OF GLENS FALLS, NEW YORK.

PAINTING MIXTURE.

1,418,416.  Specification of Letters Patent.  Patented June 6, 1922.

No Drawing.  Application filed October 28, 1921. Serial No. 511,116.

*To all whom it may concern:*

Be it known that I, VARNUM WILLIAMSON, a citizen of the United States, residing at Glens Falls, in the county of Warren and State of New York, have invented certain new and useful Improvements in a Painting Mixture, of which the following is a specification.

The present invention relates to a painting mixture and has for its object to provide a mixture of this nature having considerable preserving qualities and which will withstand the elements to greater advantage than ordinary paint.

The mixture consists preferably of one part of ordinary paint mixed with two parts of cement and one part of linseed oil.

Having thus described my invention what I claim as new is:—

A painting mixture including one part of ordinary paint, two parts of cement, and one part of linseed oil.

In testimony whereof I affix my signature in presence of two witnesses.

VARNUM WILLIAMSON.

Witnesses:
H. Y. BAIN,
HOWARD L. MONTGOMERY.